United States Patent [19]

Sprung

[11] Patent Number: 4,632,366
[45] Date of Patent: Dec. 30, 1986

[54] LINE TRAVEL NORMALIZER

[75] Inventor: Douglas L. Sprung, Camano Island, Wash.

[73] Assignee: Pipemakers, Inc., Calgary, Canada

[21] Appl. No.: 667,362

[22] Filed: Nov. 1, 1984

[51] Int. Cl.$^4$ .................................................. C21D 9/08
[52] U.S. Cl. ...................................... 266/87; 266/104; 219/10.57
[58] Field of Search ................. 266/102, 258, 103, 87, 266/104; 219/6.5, 10.61, 7.5, 8.5, 9.5, 10.53, 219, 155, 156

[56] References Cited

U.S. PATENT DOCUMENTS 4,428,563 1/1984 Cunningham et al. .............. 266/113

Primary Examiner—Christopher W. Brody
Attorney, Agent, or Firm—Kenyon & Kenyon

[57] ABSTRACT

A normalizer for linear welds in continuous pipes, to travel along the side a pipeline during operation. The normalizer comprises an induction heater supported on a mounting assembly. A power source is provided for the induction heater and an electrical control means controls the power from the power source to the induction heater. A mechanical means continuously controls the elevation and lateral placement of the mounting assembly and induction heater with respect to those of the pipe. A mechanical control means enables continuous control of the lateral placement of the mounting assembly and induction heater with respect to the pipe weld to be normalized and ensures proper placement of the induction heater over that weld. A spacer means permits adjustable spacing of the induction heater a predetermined distance from the pipe weld to be normalized, to provide a predetermined air gap between the induction heater and that weld. These elements of the normalizer are mounted on a carriage means for moveably transporting these elements along the length of pipe to be normalized. The carriage means has appropriate drive and steering means for the carriage means.

11 Claims, 3 Drawing Figures

LINE TRAVEL NORMALIZER

BACKGROUND OF THE INVENTION

The present invention relates to a normalizer for linear welds in continuous lengths of pipe, and more particularly relates to a normalizer which can, during operation, travel along beside a length of pipe produced from a mobile pipe mill such as that described for example in Vasar U.S. Pat. No. 3,014,118 issued Dec. 19, 1961 or my copending U.S. patent application Ser. Nos. 647,179 and 647,180.

After electrical resistance welding of pipe, it is necessary to reheat the forged weld to approximately 1500° F. to 1950° F., depending on the steel chemistry and allow that weld then to cool in air. This permits the grain structure to be properly refined. This is a requirement of most codes such as A.P.I. and C.S.A.

In stationary mills, this normalizing process is carried out by a normalizer inductor bar which is lowered onto the pipe as the pipe passes beneath it. Induction current through the bar heats the pipe which is then allowed to cool in the subsequent sizing section of the mill, usually assisted by a water quench. For best results, the weld zone is usually cooled to room temperature before normalizing takes place. This is not always practical in a stationary mill setup. As well, when the induction bar is lowered and raised, often the leading and trailing edges of the weld seam to be normalized are missed. Another problem often found in such normalizers is that the weld seam may become imperfectly aligned with respect to the induction bar as a long continuous length of metal pipe is formed. In such a case the seam may become offset with respect to the induction bar, reducing the efficiency of the normalizing operation.

OBJECTS OF THE INVENTION

It is an object of the present invention to provide a normalizer which reduces or avoids the problems previously experienced in conventional normalizers. It is a further object of the present invention to provide a normalizer which will be effective in operation in either stationary or mobile pipe mills.

SUMMARY OF THE INVENTION

The normalizer according to the present invention comprises an induction heater supported on a mounting assembly. A power source is provided and an electrical control means controls the power from the power source to the induction heater. A mechanical means continuously controls the elevation and lateral placement of the mounting assembly and induction heater with respect to those of the pipe. There is also provided a mechanical control means to enable continuous control of the lateral placement of the mounting assembly and induction heater with respect to the pipe weld to be normalized and to ensure proper placement of the induction heater over that weld. The normalizer also has a spacer means to permit adjustable spacing of the induction bar of the heater a predetermined distance from the pipe weld to be normalized, to provide a predetermined air gap between the induction bar and that weld. These elements of the normalizer are mounted on a carriage means for moveably transporting these elements along the length of pipe to be normalized, the carriage means having appropriate drive and steering means.

In a preferred embodiment, a heat sensor is provided to measure the heat generated at the weld by the induction heater. A computer is electronically associated with the drive means for the carriage means and the heat sensor, to control the speed of the carriage means dependent on the heat being generated at the weld by the induction heater.

The line travel normalizer according to the present invention, while designed particularly to operate on the product of mobile pipe forming devices, may work equally well in stationary pipe forming mills. As the normalizer itself operates independently of the mill operation, and is not restricted to a particular location in the mill forming apparatus, proper cooling of the pipe to be normalized, before normalizing, may be readily achieved. As well, careful alignment of the induction heater with respect to the weld seam to be normalized can be readily achieved through the mechanical control means which enables continuous control of the lateral placement of the mounting assembly and induction heater with respect to the pipe weld.

BRIEF DESCRIPTION OF THE DRAWINGS

These and other objects and advantages of the invention will become apparent upon reading the following detailed description and upon referring to the drawings in which.

Figure 1:
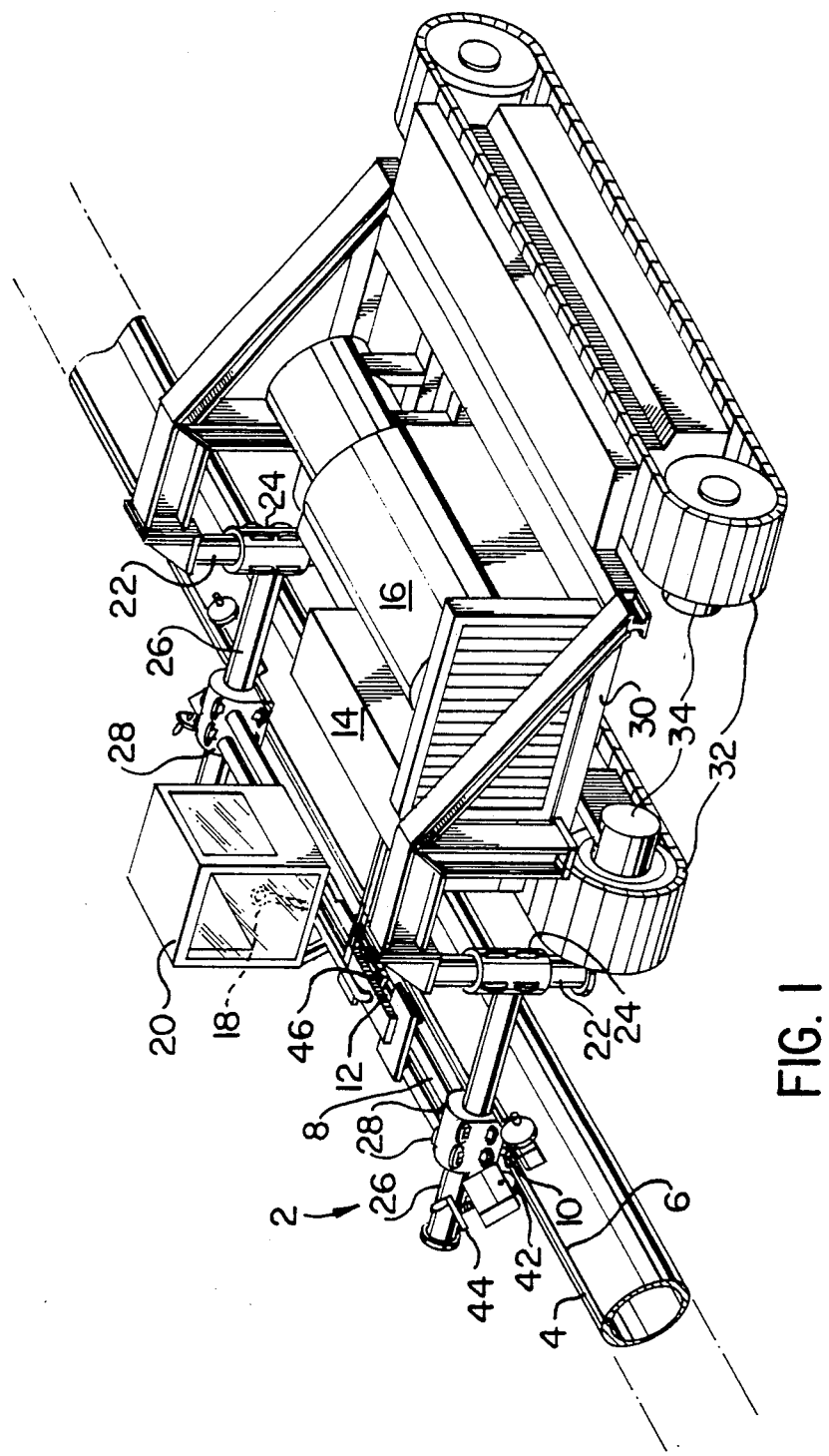
FIG. 1 is a perspective schematic view of a normalizer according to the present invention.

While the invention will be described in conjunction with an example embodiment, it will be understood that it is not intended to limit the invention to such an embodiment. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Figure 2:
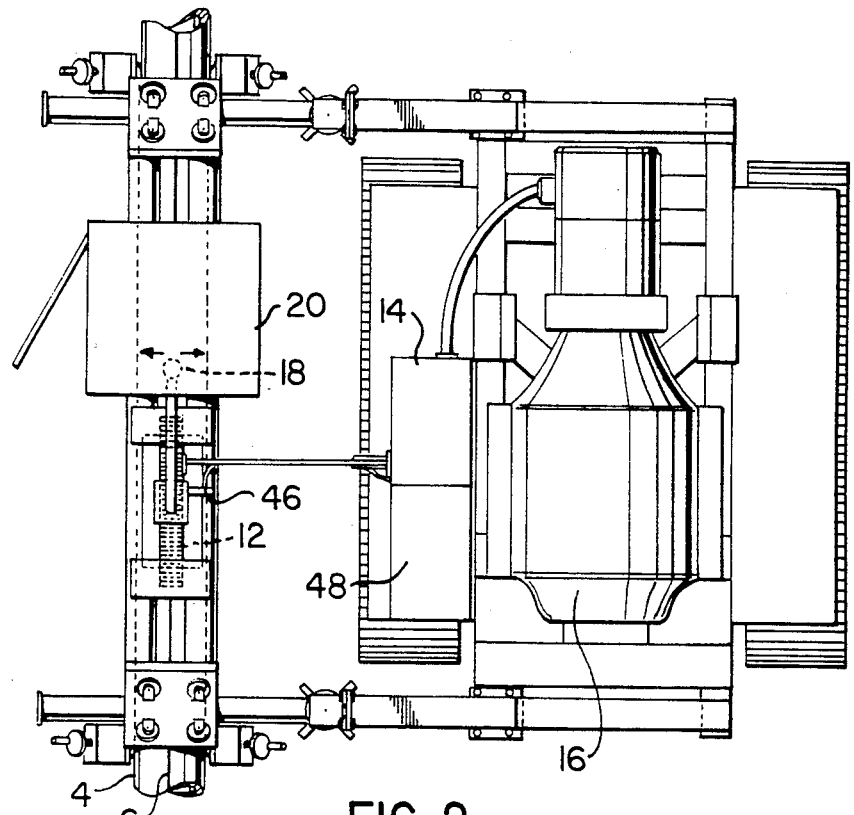
FIGS. 2 and 3 are respectively plan and front elevation views of the normalizer of FIG. 1.

Turning to FIG. 1 there is shown a line travel normalizer 2 in accordance with the present invention, normalizing a continuous length of pipe 4, which pipe has been made by forming a flat metal strip and welding along weld seam 6. The normalizer 2 comprises an induction heater 8 supported by a mounting assembly 10. Induction heater 8 is a bar made up of a number of laminated metal plates 12 (FIG. 2) and may be several feet in length. Electrical current to induction heater 8 is controlled through an electrical control means in a control cabinet 14 and power is supplied by a power means, such as a generator 16 (e.g. 500 kilowatts). Induction heater 8 is intended to lie over the weld zone from side to side and is continuously moveable by means of a seam tracker 18, illustrated as being manually controlled by an operator in cab 20, but which may alternatively be automatic. Seam tracker 18 comprises a joy stick which is moveable as illustrated to cause inductor mounting assembly or carriage frame 10 to move laterally, from side-to-side, as required, to ensure proper placement of induction heater 8 over weld seam 6.

Figure 3:
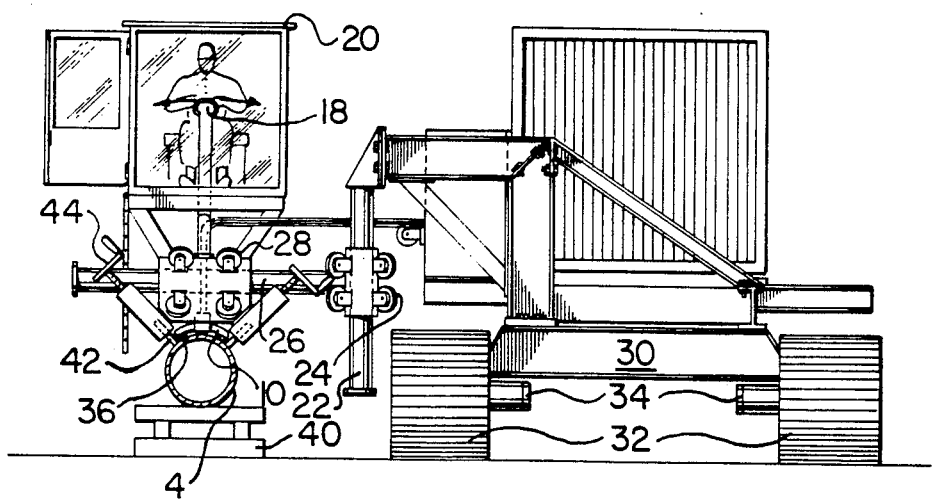

Mounting assembly 10 is also free to move vertically by mechanical control means in the form of posts 22 and roller mechanisms 24, and free to move laterally by control means in the form of bars 26 and roller mechanisms 28 to coordinate the elevation and lateral placement of mounting assembly 10 with respect to those of pipe 4. Induction heater 8 follows the contour of the pipe resting on ground or, as illustrated, on skid 40, by means of these roller mechanisms 24 and 28 which adjust for horizontal and vertical movement. Induction heater 8 is itself supported by roller bearings 36 (FIG. 3) which travel on the upper surface of pipe 4 to keep constant the air gap or space between the weld seam 6 on pipe 4 and the confronting surface of induction heater 8 (called "Stand off"). The air gap distance is adjustable by spacer means in the form of standoff wheels 42 which are laterally spaced and bear on upper lateral portions of pipe 4 as illustrated. The wheels are oriented to move longitudinally along the pipe on its upper surface. These wheels are adjustable as illustrated by means of cranks 44 to raise or lower induction heater 8 and its mounting assembly 10 (FIG. 3) with respect to pipe 4.

The entire mounting assembly and post bars and roller mechanisms are supported on a carriage, such as a tractor frame 30 mounted on tracks 32 and provided with appropriate drive and steering means (for example DC variable speed motors 34) for movement along the stationary pipe 4. The power to run motors 34 may be provided through generator 16. Of course, depending upon the terrain on which such a normalizer 2 is to be used, wheels may support tractor carriage 30 instead of tracks 32, with an appropriate drive means for the wheels being provided.

A pyrometer 46 (FIG. 2) or other temperature sensor such as an infra red temperature indicator is provided to give a reading of the temperature of the weld seam during induction heating, which temperature measurement is relayed to a computer 48. This computer either raises or lowers the induction current as required to provide a proper temperature of the heated forged weld. Depending on the alloy used in the pipe, this temperature may be in the range of 1500° F. to 1950° F.

The unit also may be provided with an ultrasonic tester (not shown) to test and record the weld condition after normalizing.

In operation, as the track-mounted normalizer 2 advances along the stationary line pipe 4. Induction heater 8 follows the contour of the pipe as previously described, heater 8 being set to an appropriate distance above the seam of the pipe by means of standoff wheels 42. The operator of carriage 10 ensures that induction heater 8 covers the weld zone using the joy stick of seam tracker 18. Horizontal and vertical deviations in the linear nature of the pipe are followed by the heater 8 and carriage 10 by means of roller mechanisms 24 and 28. The temperature developed in weld seam 6 by heater 8 is monitored by pyrometer 46 and appropriately controlled through computer 48.

Thus it is apparent that there has been provided in accordance with the invention a line travel normalizer that fully satisfies the objects, aims and advantages set forth above. While the invention has been described in conjunction with a specific embodiment thereof, it is evident that many alternatives, modifications and variations including other heat sources such as plasma, electron beam, oxy-acetylene, oxy-natural gas, oxy-propane, oxy-mapgas, etc. will be apparent to those skilled in the art in light of the foregoing description. Accordingly, it is intended to embrace all such alternatives, modifications and variations as fall within the spirit and broad scope of the invention.

What I claim as my invention:

1. A normalizer for linear welds in continuous lengths of pipes made from flat metal strip comprising:
   (a) an induction heater to lie selectively over a weld in the pipe being normalized for applying heat to the weld;
   (b) a mounting assembly for the induction heater;
   (c) a power source for the induction heater;
   (d) electrical control means for the induction heater to control the power from the power source to the induction heater;
   (e) mechanical means to continuously coordinate the elevation and lateral placement of the mounting assembly and induction heater with respect to those of the pipe;
   (f) mechanical control means to enable continuous control of the lateral placement of the mounting assembly and induction heater with respect to the pipe weld to be normalized and to ensure proper placement of the induction heater over the weld;
   (g) spacer means to permit adjustable spacing of the induction heater a predetermined distance from the pipe weld to be normalized and provide a predetermined constant air gap between the induction heater and that weld;
   (h) carriage means on which elements (a) through (g) of the normalizer are mounted for movably transporting these elements along the pipe to be normalized; and
   (i) drive and steering means for the carriage means.

2. A normalizer according to claim 1 further provided with a heat sensor means to determine the heat generated at the weld by said induction heater.

3. A normalizer according to claim 2 wherein said heat sensor means is one of an optical pyrometer and an infra red temperature indicator.

4. A normalizer according to claim 2 wherein a computer is electronically associated with said carriage means and with said heat sensor means to control the speed of said carriage means dependent on the heat being generated at the weld by said induction heater.

5. A normalizer according to claim 1 wherein said mounting assembly for said induction heater includes roller bearings to rest on the surface of the pipe and support said mounting assembly thereon.

6. A normalizer according to claim 1 wherein said spacer means comprises laterally spaced standoff wheels associated with said mounting assembly to bear on upper, lateral portions of the pipe surface, said standoff wheels being oriented to move longitudinally with respect to the pipe and being mechanically adjustable to provide an air gap between said induction heater and the pipe weld.

7. A normalizer according to claim 1 which further comprises a manually operable mechanical means for continuously controlling the lateral placement of said mounting assembly and induction heater with respect to the pipe weld to be normalized.

8. A normalizer according to claim 1 wherein said mounting assembly and induction heater are supported on roller mechanisms freely laterally and vertically moveable on respective supports carried on said carriage means, to permit the continuous coordination of the elevation and lateral placement of said mounting assembly and induction heater with respect to those of the pipe.

9. A normalizer according to claim 6 wherein said mounting assembly and induction heater are supported on roller mechanisms freely laterally and vertically moveable on respective supports carried on said carriage means, to permit the continuous coordination of the elevation and lateral placement of said mounting assembly and induction heater with respect to those of the pipe.

10. A normalizer for a linear weld in a continuous length of pipe comprising a carriage for movement along a stationary length of pipe;

an induction heater for inductively heating a weld seam extending longitudinally of the pipe;

a mounting assembly on said carriage for mounting said induction heater over the weld seam of the pipe;

a seam tracker mounted on said carriage for moving said induction heater laterally of the weld seam;

spacer means on said carriage for adjusting said induction heater vertically relative to the pipe during movement of said spacer means along the pipe; and mechanical means to continuously coordinate the elevation and lateral placement of said mounting assembly and induction heater with respect to those of the pipe.

11. A normalizer as set forth in claim 10 wherein said induction heater is a bar.

* * * * *